(12) United States Patent
Herndon et al.

(10) Patent No.: US 7,893,585 B2
(45) Date of Patent: Feb. 22, 2011

(54) MOTOR ASSEMBLY WITH MULTIFUNCTIONAL COMPONENTS

(75) Inventors: Troy Michael Herndon, San Jose, CA (US); Jeffry Arnold LeBlanc, Aptos, CA (US); Robert Alan Nottingham, Santa Cruz, CA (US); Norbert Steven Parsoneault, Scotts Valley, CA (US); Paco Flores, Felton, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 12/709,439

(22) Filed: Feb. 19, 2010

(65) Prior Publication Data

US 2010/0141071 A1 Jun. 10, 2010

Related U.S. Application Data

(62) Division of application No. 11/317,561, filed on Dec. 22, 2005, now Pat. No. 7,679,243.

(51) Int. Cl.
*H02K 5/16* (2006.01)
*H02K 7/08* (2006.01)

(52) U.S. Cl. .................... 310/90; 310/67 R
(58) Field of Classification Search .......... 310/90, 310/67 R
See application file for complete search history.

(56) References Cited

U.S. PATENT DOCUMENTS

| | | | | |
|---|---|---|---|---|
| 4,132,414 A * | 1/1979 | Dinsdale | ............... | 369/241 |
| 5,134,331 A * | 7/1992 | Miyaji et al. | ............... | 310/90 |
| 5,328,270 A * | 7/1994 | Crawford et al. | ............... | 384/100 |
| 5,347,189 A * | 9/1994 | Chuta et al. | ............... | 310/90 |
| 5,423,612 A * | 6/1995 | Zang et al. | ............... | 384/119 |
| 5,427,456 A * | 6/1995 | Hensel | ............... | 384/112 |
| 5,448,120 A * | 9/1995 | Schaule et al. | ............... | 310/90 |
| 5,487,608 A * | 1/1996 | Leuthold et al. | ............... | 384/113 |
| 5,516,212 A * | 5/1996 | Titcomb | ............... | 384/107 |
| 5,524,986 A * | 6/1996 | Leuthold et al. | ............... | 384/119 |
| 5,533,812 A * | 7/1996 | Leuthold et al. | ............... | 384/112 |
| 5,561,335 A * | 10/1996 | Dunfield et al. | ............... | 310/90.5 |
| 5,577,842 A * | 11/1996 | Parsoneault et al. | ............... | 384/114 |
| 5,601,125 A * | 2/1997 | Parsoneault et al. | ............... | 141/51 |
| 5,653,540 A * | 8/1997 | Heine et al. | ............... | 384/123 |
| 5,678,929 A * | 10/1997 | Parsoneault et al. | ............... | 384/112 |
| 5,685,647 A * | 11/1997 | Leuthold et al. | ............... | 384/113 |
| 5,716,141 A * | 2/1998 | Chen | ............... | 384/114 |

(Continued)

FOREIGN PATENT DOCUMENTS

KR 2004075303 A * 8/2004

*Primary Examiner*—Quyen Leung
*Assistant Examiner*—Alex W Mok (57) ABSTRACT

Multifunctional components enable the construction of economical motor assemblies. A first embodiment of the present invention provides a hub, cup, spindle, and base assembly for a motor assembly having at least one journal bearing, at least one thrust bearing, and at least one fluid seal. A second embodiment of the present invention provides a hub, spindle, and base with integrated cup assembly for a disc drive bearing having at least one journal bearing, at least one thrust bearing, and at least one fluid seal. In a third embodiment, a hub is rotatably assembled with a spindle coupled to a thrust bearing, prior to assembly with a base. In further embodiments, motor assemblies comprise the above embodiments combined with stator and rotor assemblies.

20 Claims, 12 Drawing Sheets

U.S. PATENT DOCUMENTS

| | | | | |
|---|---|---|---|---|
| 5,777,403 | A * | 7/1998 | Yuan | 310/12.16 |
| 5,793,129 | A * | 8/1998 | Parsoneault et al. | 310/216.048 |
| 5,847,479 | A * | 12/1998 | Wang et al. | 310/90 |
| 5,908,247 | A * | 6/1999 | Leuthold et al. | 384/114 |
| 5,925,949 | A * | 7/1999 | Jung et al. | 310/67 R |
| 5,925,955 | A * | 7/1999 | Norris | 310/90 |
| 5,940,246 | A * | 8/1999 | Khan et al. | 360/99.08 |
| 5,956,204 | A * | 9/1999 | Dunfield et al. | 360/98.07 |
| 5,969,448 | A * | 10/1999 | Liu et al. | 310/90 |
| 5,969,903 | A * | 10/1999 | Parsoneault et al. | 360/99.08 |
| 5,973,426 | A * | 10/1999 | Fujinaka et al. | 310/49.39 |
| 5,977,674 | A * | 11/1999 | Leuthold et al. | 310/90 |
| 5,980,113 | A * | 11/1999 | Grantz | 384/108 |
| 6,019,516 | A * | 2/2000 | Leuthold et al. | 384/110 |
| 6,055,126 | A * | 4/2000 | Kennedy et al. | 360/99.08 |
| 6,065,877 | A * | 5/2000 | Leuthold et al. | 384/278 |
| 6,118,620 | A * | 9/2000 | Grantz et al. | 360/99.08 |
| 6,137,650 | A * | 10/2000 | Heine et al. | 360/98.07 |
| 6,144,523 | A * | 11/2000 | Murthy et al. | 360/99.08 |
| 6,148,501 | A * | 11/2000 | Grantz et al. | 29/603.03 |
| 6,149,159 | A * | 11/2000 | Kloeppel et al. | 277/399 |
| 6,149,161 | A * | 11/2000 | Grantz et al. | 277/427 |
| 6,183,135 | B1 * | 2/2001 | Kloeppel et al. | 384/112 |
| 6,280,088 | B1 * | 8/2001 | Leuthold et al. | 384/110 |
| 6,285,527 | B1 * | 9/2001 | Kennedy et al. | 360/99.08 |
| 6,296,390 | B1 * | 10/2001 | Wolff et al. | 384/112 |
| 6,296,391 | B1 * | 10/2001 | Hayakawa et al. | 384/119 |
| 6,307,291 | B1 * | 10/2001 | Iwaki et al. | 310/90 |
| 6,402,383 | B1 * | 6/2002 | Parsoneault et al. | 384/100 |
| 6,575,634 | B2 * | 6/2003 | Nottingham | 384/110 |
| 6,583,952 | B1 * | 6/2003 | Grantz et al. | 360/99.08 |
| 6,594,883 | B2 * | 7/2003 | Kloeppel et al. | 29/596 |
| 6,756,715 | B2 * | 6/2004 | Hirose et al. | 310/90 |
| 6,982,510 | B1 * | 1/2006 | Ajello et al. | 310/90 |
| 2002/0130571 | A1 * | 9/2002 | Kodama | 310/90 |
| 2002/0196582 | A1 * | 12/2002 | Nii et al. | 360/99.08 |
| 2003/0094869 | A1 * | 5/2003 | Ameen et al. | 310/90 |
| 2004/0012287 | A1 * | 1/2004 | Kloeppel et al. | 310/90 |
| 2004/0091187 | A1 * | 5/2004 | Aiello et al. | 384/112 |
| 2004/0091188 | A1 * | 5/2004 | Aiello et al. | 384/119 |
| 2004/0160137 | A1 * | 8/2004 | Obara et al. | 310/90 |
| 2004/0169430 | A1 * | 9/2004 | Winterhalter | 310/90 |
| 2004/0208404 | A1 * | 10/2004 | Dittmer et al. | 384/107 |
| 2004/0223673 | A1 * | 11/2004 | Tiller et al. | 384/107 |
| 2005/0001495 | A1 * | 1/2005 | Takahashi et al. | 310/90 |
| 2005/0052089 | A1 * | 3/2005 | Horng et al. | 310/90 |
| 2005/0093386 | A1 * | 5/2005 | Kim | 310/90 |
| 2005/0116564 | A1 * | 6/2005 | Tokunaga et al. | 310/90 |

* cited by examiner

MOTOR ASSEMBLY WITH MULTIFUNCTIONAL COMPONENTS

CROSS REFERENCE TO RELATED APPLICATIONS

This is a Divisional application of U.S. patent application Ser. No. 11/317,561, now U.S. Pat. No. 7,679,243, entitled "Motor Assembly With Multifunctional Components", by Herndon et al., filed Dec. 22, 2005, which is hereby incorporated by reference.

TECHNICAL FIELD

The present invention relates to the field of motor assemblies, and in particular to motor assemblies having multifunctional components for electronic memory systems, such as disc drive memory systems.

BACKGROUND

Disc drive memory systems have been used in computers for many years for storage of digital information. Information is recorded on concentric memory tracks of a magnetic disc medium, the actual information being stored in the form of magnetic transitions within the medium. The discs themselves are mounted on a hub that is rotatably mounted on a fixed spindle. The information is accessed by means of read/write heads generally located on a pivoting arm that moves radially over the surface of the disc. The read/write heads or transducers must be accurately aligned with the storage tracks on the disc to ensure proper reading and writing of information.

During operation, the discs are rotated at very high speeds within an enclosed housing by means of an electric motor generally located inside the hub that supports the discs. One type of motor in common use is known as an in-hub or in-spindle motor. Such in-spindle motors typically have a spindle mounted by means of ball or fluid dynamic bearing systems to a fixed motor shaft (spindle) disposed in the center of the hub. Generally, such motors include a stator formed in a base of the assembly, comprising a plurality of teeth arranged in a circle. Each of the teeth supports coils or windings that may be sequentially energized to polarize the stator. A plurality of permanent magnets are disposed in alternating polarity on an inside rim of the hub, adjacent the stators. As the coils disposed on the stators are sequentially energized in alternating polarity, the magnetic attraction and repulsion of each stator to the adjacent magnets cause the hub to rotate, thereby rotating the disc and passing the information storage tracks across the head.

The use of fluid dynamic bearing assemblies in such drive systems can be preferred due to desirable reductions in drive size and noise generation as compared to conventional ball bearing drive systems. In fluid dynamic bearings, a lubricating fluid functions as the bearing surface between a spindle and a hub. Such bearings are of the journal and thrust types. Journal bearings fix the radial position of a hub as it rotates around a spindle. Thrust bearings constrain the axial position of the hub as it rotates.

To create fluid dynamic bearings, one, or the other, or both mating hub and spindle surfaces can be patterned with grooves and lands in various patterns to make lubricant fluid pumps that are actuated by the rotation of the hub relative to the spindle. Such pumps can maintain lubricant fluid pressure gradients while the hub is rotating, providing thrust and journal bearing functions. When the hub is not rotating, lubricant fluids can be maintained in place in the hub-to-spindle gap by capillary forces.

For disc drives having first and second covers mounted to the spindle for improved mechanical stability, lubricant fluid loss is inevitable at both termini of the spindle, and can be an operational lifetime limiting factor for such disc drives. Sealing techniques include capillary seals and labyrinth seals. Capillary seals are flared channels that rely on the surface tension of the lubricant fluid to form a meniscus as the walls of a channel flare apart. Capillary seals can also serve as reservoirs for lubricant fluid, but they are prone to lubricant loss through evaporation at the surface of the meniscus. Labyrinth seals can be used with capillary seals to further reduce lubricant evaporation by providing an elongate pathway for lubricant vapor to escape. Unfortunately, effective labyrinth seals tend to consume a fair amount of space, and are therefore difficult to use at both ends of a spindle. Different seal designs can be used at each end of a spindle, but is important for the lubricant fluid pressures at the first and second seals to be at nearly the same pressure to reduce the loss of lubricant fluid from the seal with the lower pressure.

SUMMARY

According to one embodiment of the invention, a disc drive assembly comprises: a spindle including a first end region, a second end region, and at least journal bearing pattern formed on a circumferential surface thereof, and including a coupling structure depending from the second end region; a generally cup shaped structure including an open first end portion, a second end portion, and an inner surface that tapers outwardly from at least about the first end portion to at least about the second end portion; a hub including a recessed region configured to fit rotatably between the spindle and the cup shaped structure, and defining a central opening through which the coupling structure is fixedly secured to the second end portion and about which the hub rotates, and including a thrust bearing pattern adjacent the second end region of the spindle; and a disc including magnetic storage media mounted to rotate with the hub. In some embodiments the coupling structure of the spindle couples to the second end portion of the generally cup shaped structure by press fit. In further embodiments an outer circumferential surface of the spindle and an inner surface of the recessed region of the hub are contoured to form a capillary seal, and an outer circumferential surface of the recessed region of the hub and an inner surface of the generally cup shaped structure are contoured to form a capillary seal. In still further embodiments the open first end portion of the generally cup shaped structure further comprises a lip, and a surface of the lip further comprises a labyrinth seal with an adjacent surface of the hub. In some embodiments, the hub further comprises a lubricant recirculation channel. In some embodiments, the first end of the spindle can be configured to accept a bolt or a screw for the attachment of a disc drive cover.

In some embodiments the generally cup shaped structure is formed in a base structure. Whereas in other embodiments the generally cup shaped structure and a base structure are separate structures that are coupled together near the second end of the generally cup shaped structure.

In another embodiment, a disc drive assembly comprises: a spindle including a first end region, a second end region, and at least one journal bearing pattern formed on a circumferential surface thereof and including a coupling structure depending from the second end region; a base having a generally cup shaped structure formed therein, the generally cup shaped structure including an open first end portion, a second end portion and an inner surface that tapers outwardly from at least about the first end portion to at least about the second end portion; a thrust washer having first and second surfaces, and having a fluid dynamic bearing pattern formed on the first surface thereof, and defining a central hole configured to couple with the coupling structure of the spindle, and having an outer circumferential region configured to couple with the inner surface of the second end portion of the generally cup shaped structure; a hub including a recessed region configured to fit rotatably between the spindle, the thrust washer, and the cup shaped structure and defining a central opening through which the coupling structure of the spindle is fixedly secured to the central hole of the thrust washer, and including a surface adjacent to the fluid dynamic bearing pattern formed on the first surface of the thrust washer; and a disc including magnetic storage media mounted to rotate with the hub. Otherwise, features are similar to those discussed in connection with the above embodiment.

In further embodiments, a disc drive motor can be configured with the assemblies of the embodiments described above, by including a permanent magnet rotor and fixed stator coils.

BRIEF DESCRIPTION OF THE DRAWINGS

Common reference numbers among the drawings refer to common features of the embodiments.

DETAILED DESCRIPTION

The following description is presented to enable a person of ordinary skill in the art to make and use various aspects of the inventions. Descriptions of specific materials, techniques, and applications are provided only as examples. Various modifications to the examples described herein will be readily apparent to those skilled in the art, and the general principles defined herein may be applied to other examples and applications without departing from the spirit and scope of the inventions. For example, aspects and examples may be employed in a variety of motors, including motors for use in disc storage drives. Motors for disc storage drives may be designed and may operate in a number of ways. The exemplary motors and other exemplary subject matter provided herein are for illustrating various aspects and are not intended to limit the range of motors and devices in which such examples and aspects may be applied.

During operation, the discs can be rotated at very high speeds within an enclosed housing by means of an electric motor generally located inside the hub that supports the discs. In some embodiments, the motor is known as an in-hub or in-spindle motor. Such in-spindle motors can have a spindle mounted by means of ball or fluid dynamic bearing systems to a fixed motor shaft (spindle) disposed in the center of the hub. In some embodiments, such motors include a stator formed in a base of the assembly, comprising a plurality of teeth arranged in a circle. Each of the teeth can support coils or windings that may be sequentially energized to polarize the stator. In some embodiments, a plurality of permanent magnets can be disposed in alternating polarity on an inside rim of the hub, adjacent the stators. As the coils disposed on the stators are sequentially energized in alternating polarity, the magnetic attraction and repulsion of each stator to the adjacent magnet can cause the hub to rotate, thereby rotating the disc and passing the information storage tracks across the head.

Figure 1:
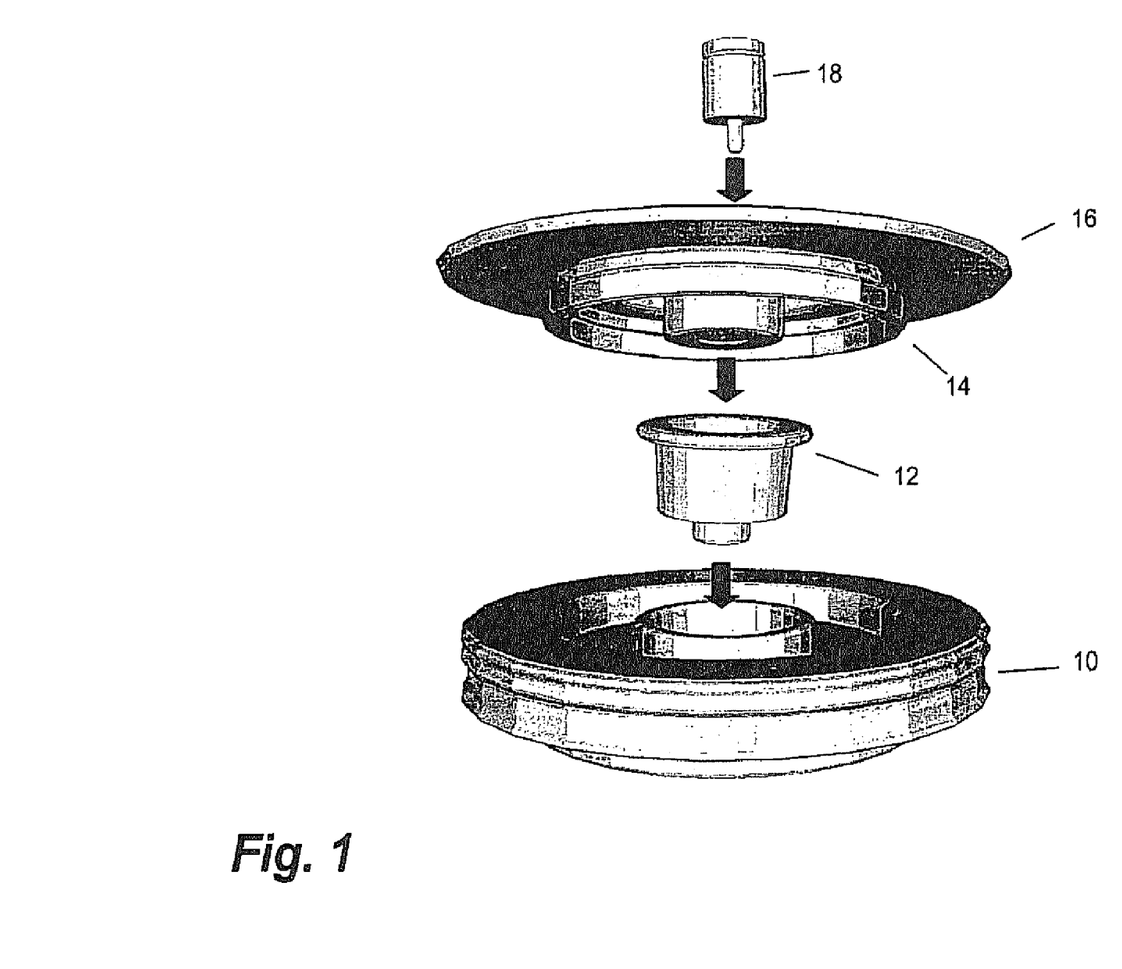
FIG. 1 illustrates an exploded perspective view of a disk drive assembly according to a first embodiment of the invention.
Figure 2:
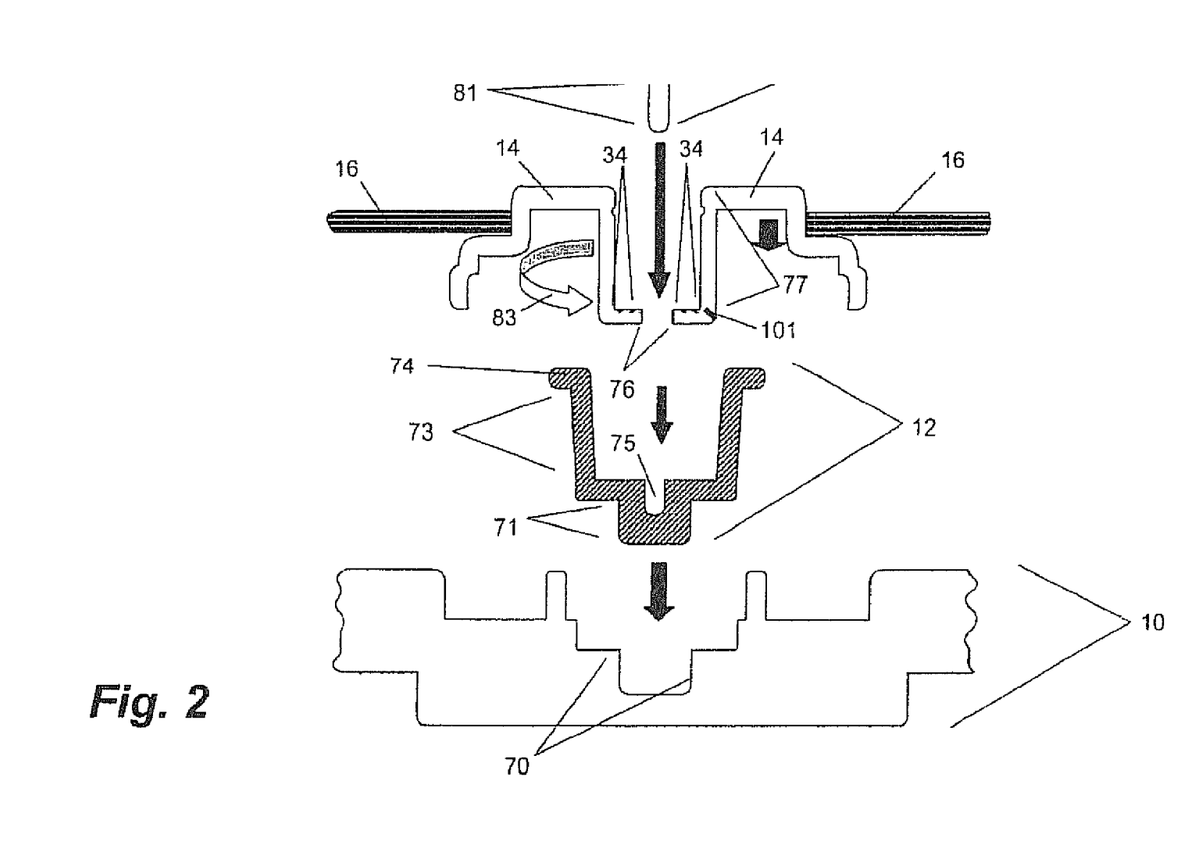
FIG. 2 illustrates an exploded, cross-sectional diagram of the embodiment of FIG. 1.
Figure 3:
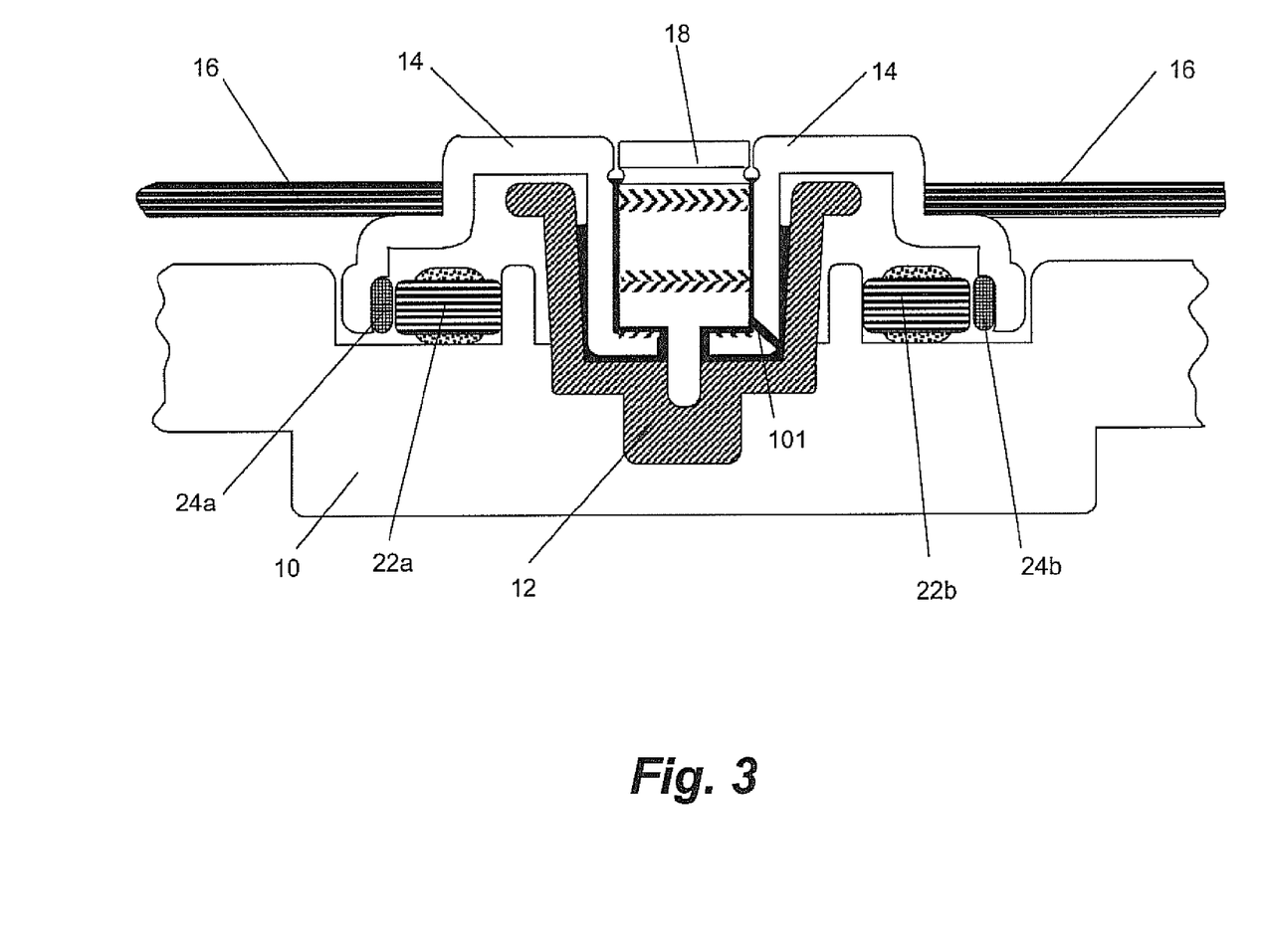
FIG. 3 illustrates an assembled, cross-sectional diagram of the embodiment of FIG. 2.

FIG. 1 illustrates an exploded, perspective view of a disk drive assembly according to an embodiment of the invention, and FIG. 2 illustrates an exploded, cross-sectional view of the embodiment of FIG. 1. FIG. 3 illustrates an assembled, cross-sectional view of the embodiments of FIGS. 1 and 2.

Referring to FIGS. 1, 2, and 3, cup 12 is assembled with base 10 rotatably captivating recessed region 77 of hub 14, recessed region 77 having a central open region 76. As can be easily seen in FIG. 2 in cross section, the generally cup shaped structure (hereinafter referred to as the "cup") 12 is roughly cylindrical, and sealed at the bottom. In some embodiments bottom projection 71 can have a smaller diameter than the main cup section 73. In such embodiments, bottom projection can fit into cavity 70 of base 10. In other embodiments, bottom projection 71 can be omitted. Cup 12 can be made of steel, aluminum, bronze, or other appropriate materials as are well known to one of ordinary skill in the art. Cup 12 can be affixed to base 10 by press fit, welding, or adhesive. According to some embodiments cup 12 can have sidewalls that taper outward toward the open end of the cup where they meet with cup lip 74. This outward taper provides for a capillary seal when the cup is assembled with hub 14 (see item 35 in FIG. 4). Cup lip 74 can form a labyrinth seal with adjacent surfaces of hub 14, when assembled.

Referring now to the embodiment of FIG. 2, spindle 18 comprises body segment 80 and cup attachment section 81. Spindle attachment section 81 is configured to extend through central open region 76 of recessed region 77 of hub 14 so as to allow for the rotation of hub 14 about spindle 18. Body segment 80 of spindle 18 comprises capillary seal section 82, and fluid dynamic journal bearing sections 32a and 32b. Although two fluid dynamic journal bearing sections are illustrated, other embodiments of the invention could have one or any number of fluid dynamic journal bearing sections. In one embodiment, spindle 18 is attached to cup 12 via press fit of spindle section 81 into complementary hole 75 of cup 12. Alternative attachment methods such as are well known to one of ordinary skill in the art may also be used. The spindle can be made of steel, aluminum, or other appropriate materials as are well known to one of ordinary skill in the art. As can be seen in FIG. 3, when spindle 18 is coupled to cup 12, and cup 12 is coupled to base 10, hub 14 is rotatably fixed in position by spindle 18. An arrow depicting a rotation of hub 14 is shown as arrow 83 in FIG. 2. Recirculation channel 101 provides lubricant fluid communication between the cup 12 and hub 14 interface, and the hub 14 and spindle 18 interface. A plurality of permanent magnets 24a and 24b can be disposed in alternating polarity on an inside rim of hub 14, adjacent stators 22a and 22b that are coupled to base 10.

Figure 4:
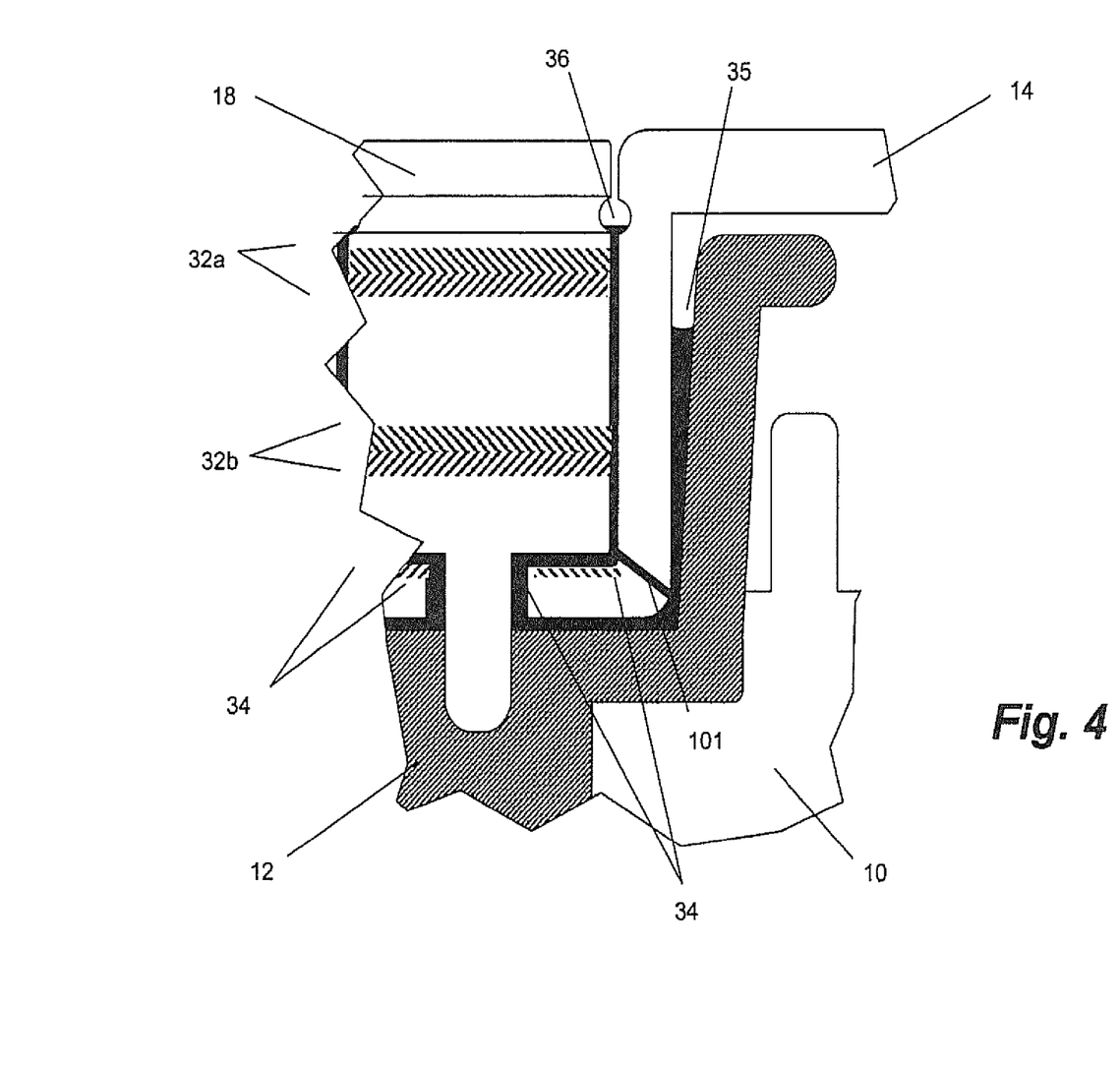
FIG. 4 illustrates a detail of the cross-sectional diagram of FIG. 3.

FIG. 4 presents a detail of the embodiment shown in FIG. 3. In this embodiment, an inner face of hub 14 has been patterned to provide a thrust bearing 34, adjacent to a surface of spindle 18. Alternatively, the surface of spindle 18 that is illustrated as being adjacent to thrust bearing 34 could be patterned as a thrust bearing. In this embodiment, there are two capillary seals. One capillary seal 36 is formed between hub 14 and spindle 18. The other capillary seal 35 is formed between hub 14 and cup 12. In some embodiments, cup 12 can be at least partially filled with lubricant fluid prior to assembly with hub 14 and spindle 18. Hub 14 can be made of steel, aluminum, or other appropriate materials as are well known to one of ordinary skill in the art.

Figure 5:
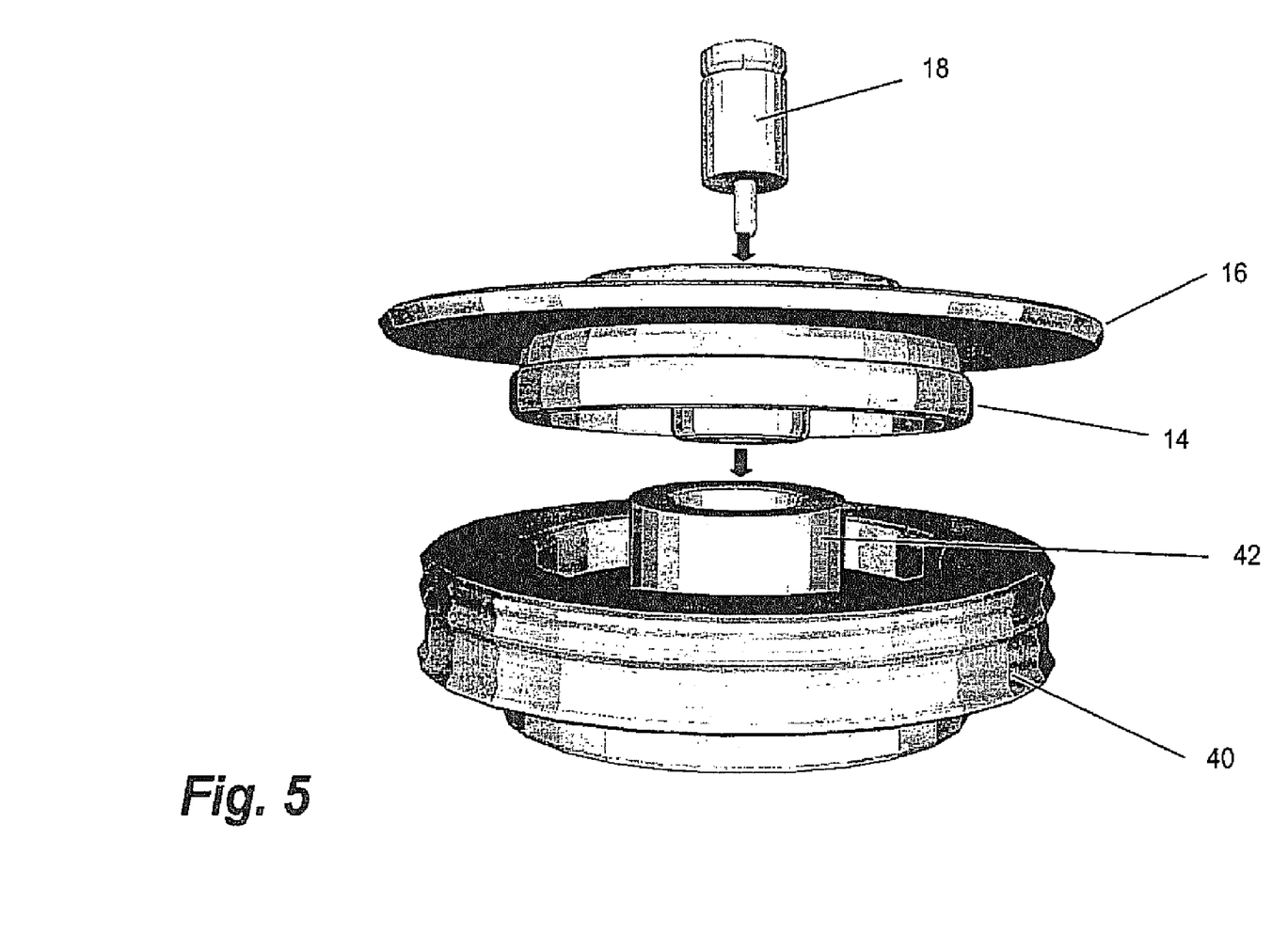
FIG. 5 illustrates an exploded perspective view of a disk drive assembly according to a second embodiment of the invention.
Figure 6:
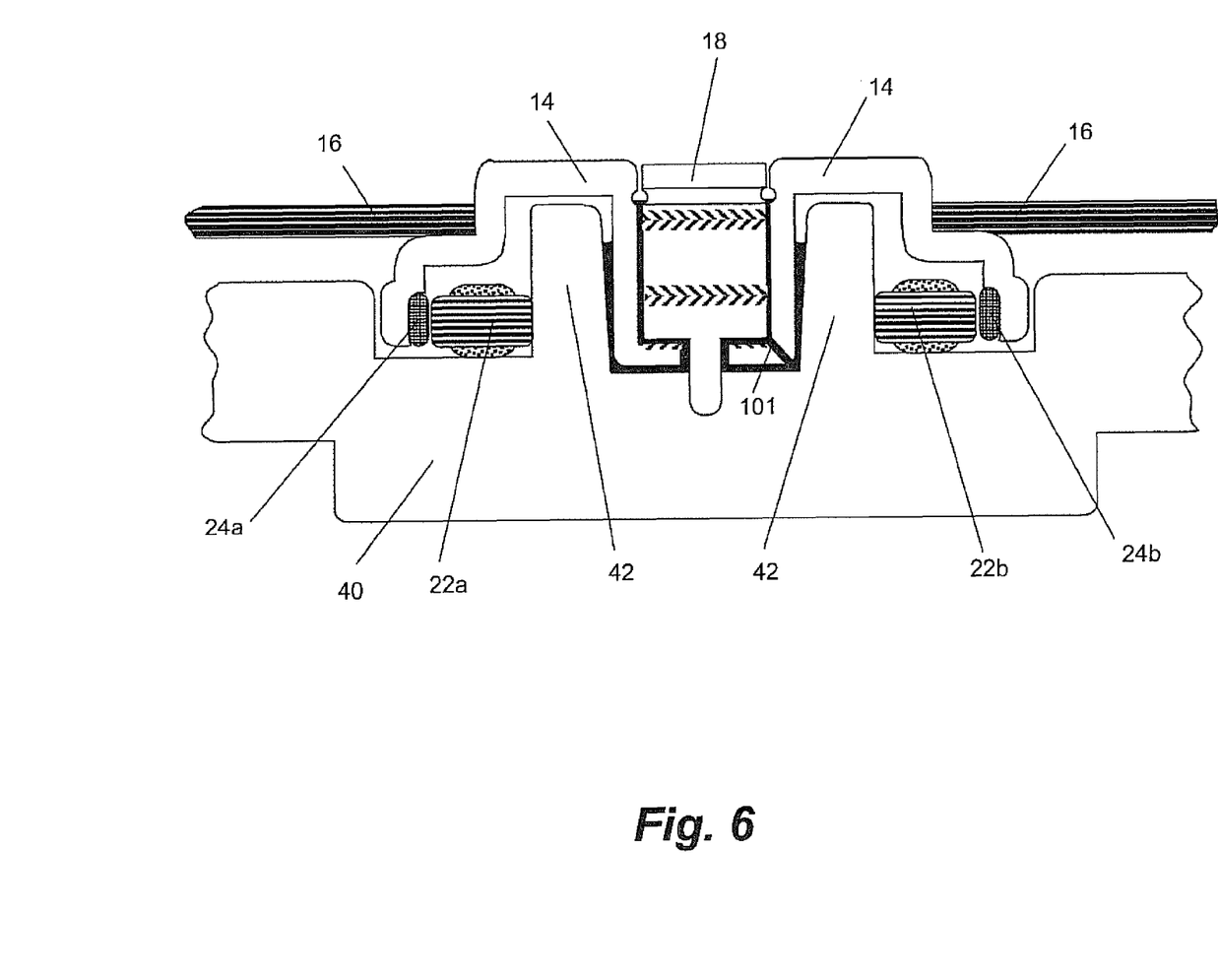
FIG. 6 illustrates an assembled, cross-sectional diagram of the embodiment of FIG. 5.

FIG. 5 illustrates an exploded perspective view of a second embodiment of the invention in which cup section 42 is integrated with base section 40. Hub 14, coupled to at least one disc 16 is rotatably assembled with cup section and held in place at least partially by spindle 18, as can be seen in cross-section in FIG. 6. Other elements of this embodiment are as described above, in connection with the previous embodiment.

Figure 7A:
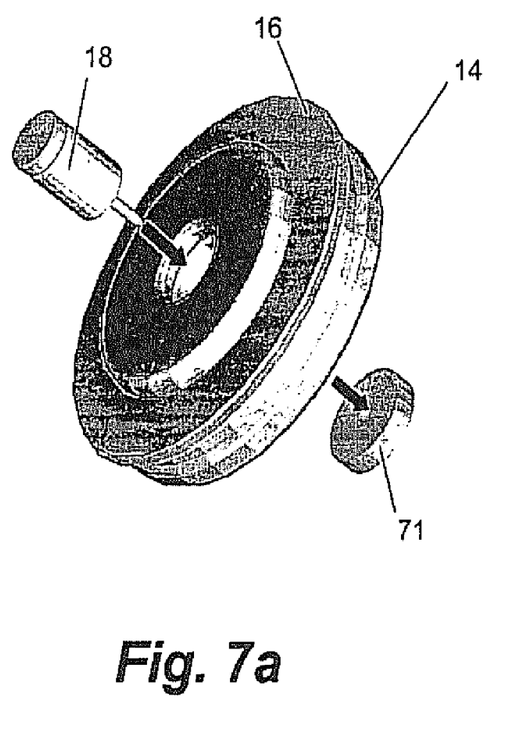
FIGS. 7A and 7B show two different exploded perspective views of a hub, spindle, and thrust washer subassembly of third embodiment of the invention.
Figure 7B:
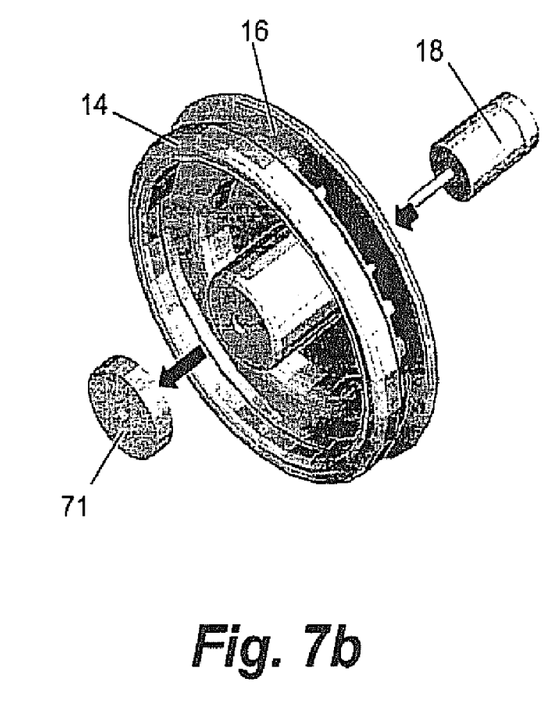
Figure 8:
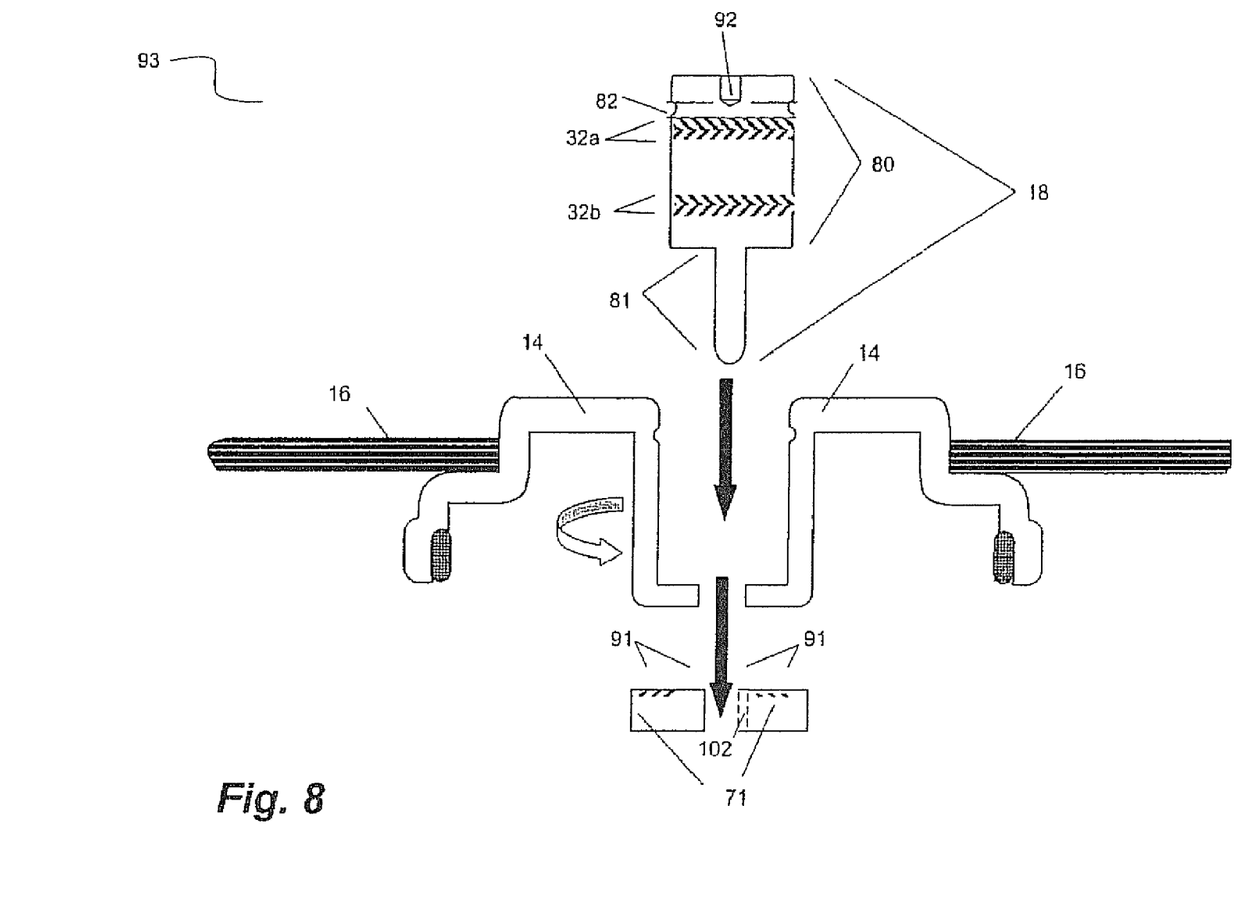
FIG. 8 illustrates an exploded cross-sectional view of the subassembly of FIGS. 7A and 7B.

FIGS. 7a and 7b show top and bottom exploded, perspective views of a spindle, hub, and thrust washer assembly according to a third embodiment. Hub 14 is coupled to at least one disc 16. Spindle 18 can be inserted through hub 14, as shown, and coupled to thrust washer 71. Thrust washer 71 can be configured with an inner hole for coupling to spindle 18, an outer circumferential region configured for coupling with the inner surface of cup section 42, and a surface patterned with a fluid dynamic bearing configured to function as a thrust bearing when assembled with an adjacent surface of hub 14. FIG. 8 illustrates a cross-sectional view of the embodiment of FIG. 7. Spindle 18 can be coupled to thrust washer 71 through press-fit, welding, adhesives, or other methods that are well known to one of ordinary skill in the art. Thrust washer 71 can be configured with a surface patterned with a fluid dynamic bearing 91 configured to function as a thrust bearing when assembled with an adjacent surface of hub 14. Spindle 18 can be configured with a cavity 92 to accept a bolt or a screw for the attachment of a disc drive cover or a motor assembly cover.

Figure 9:
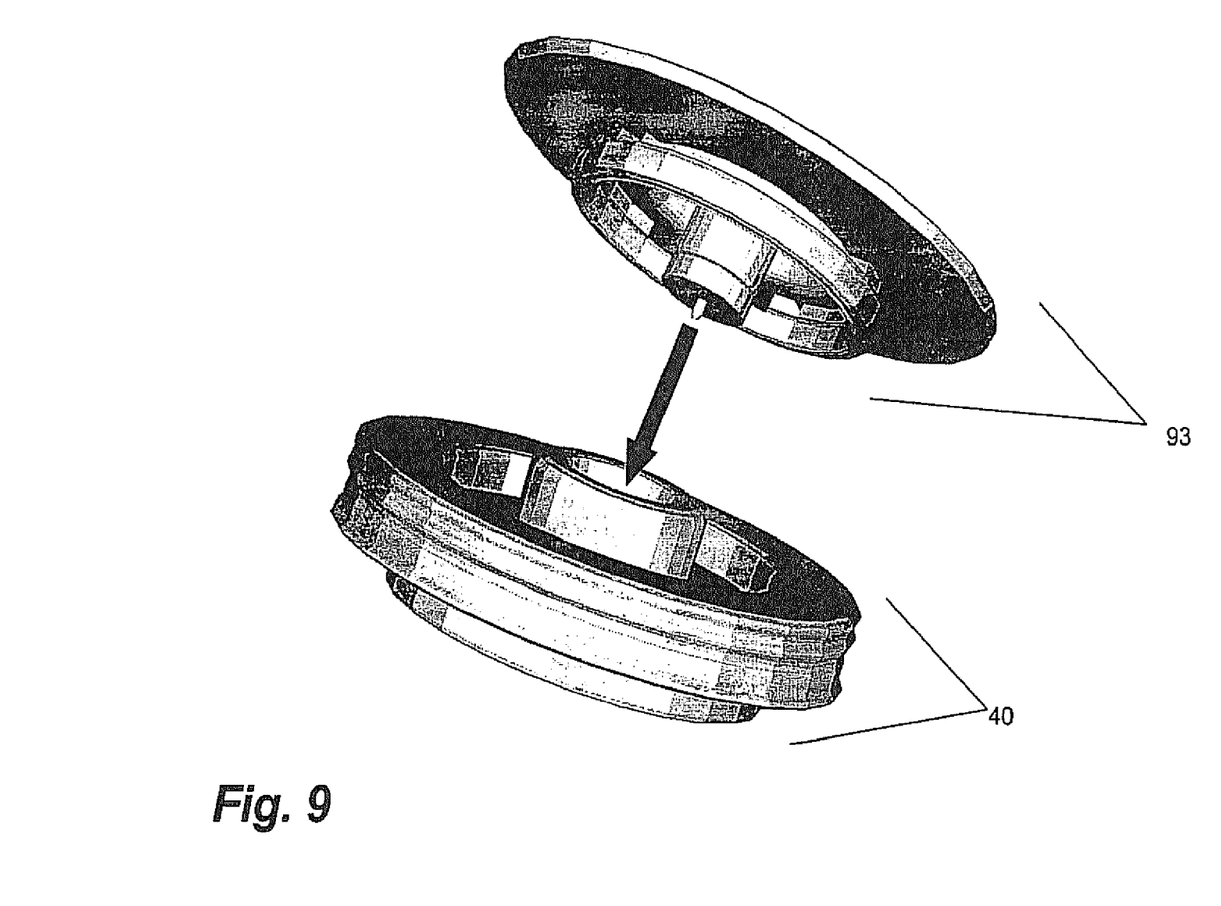
FIG. 9 illustrates an exploded perspective view of the hub and spindle subassembly and a disc drive base.
Figure 10:
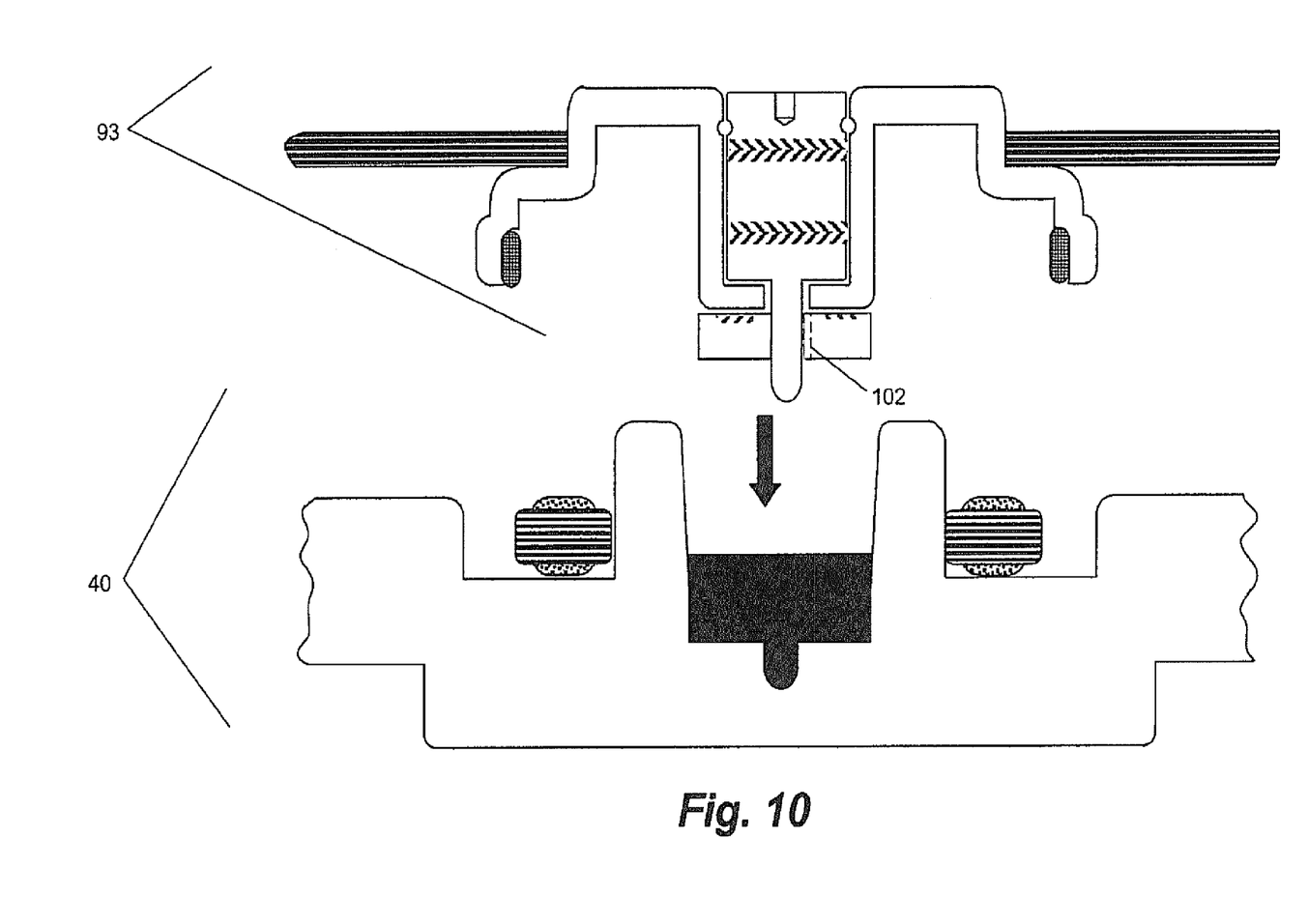
FIG. 10 illustrates a cross-sectional view of the embodiment of FIG. 9.
Figure 11:
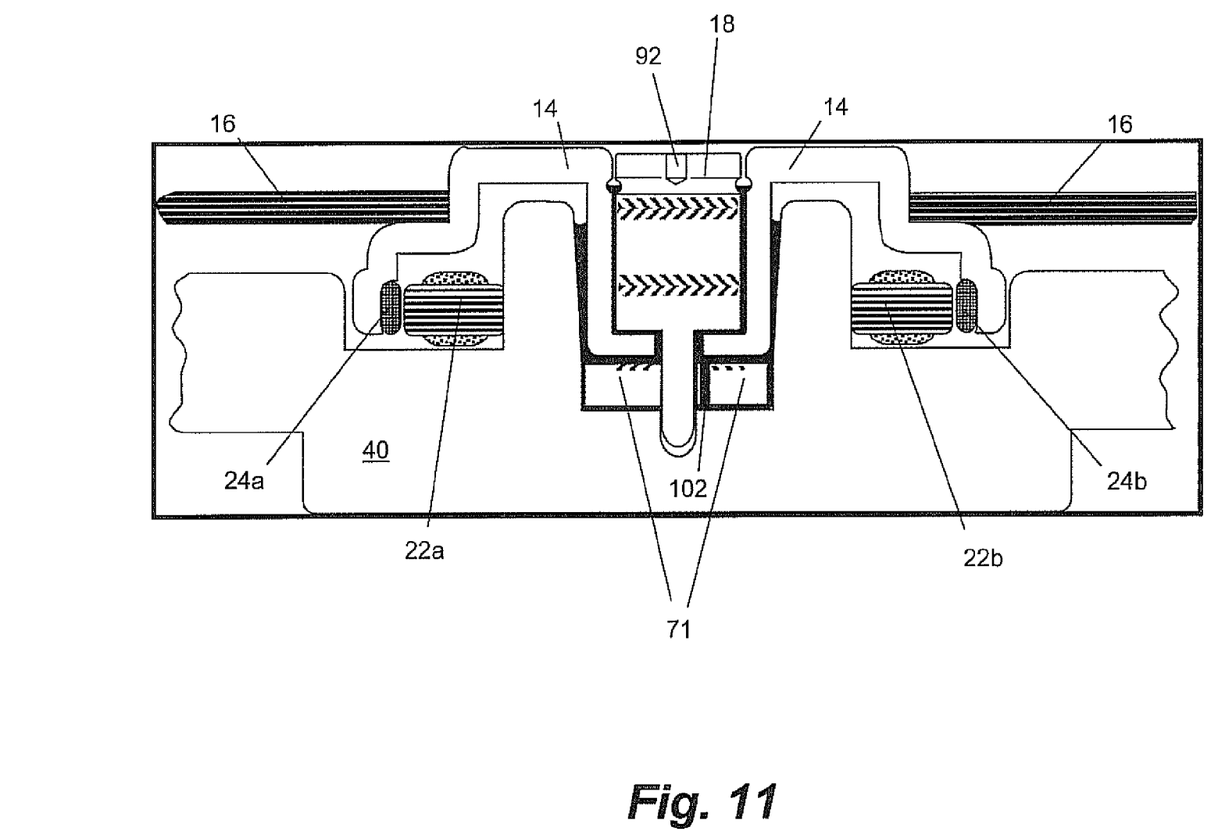
FIG. 11 illustrates a cross-sectional view of the embodiment of FIG. 9, after assembly.
Figure 12:
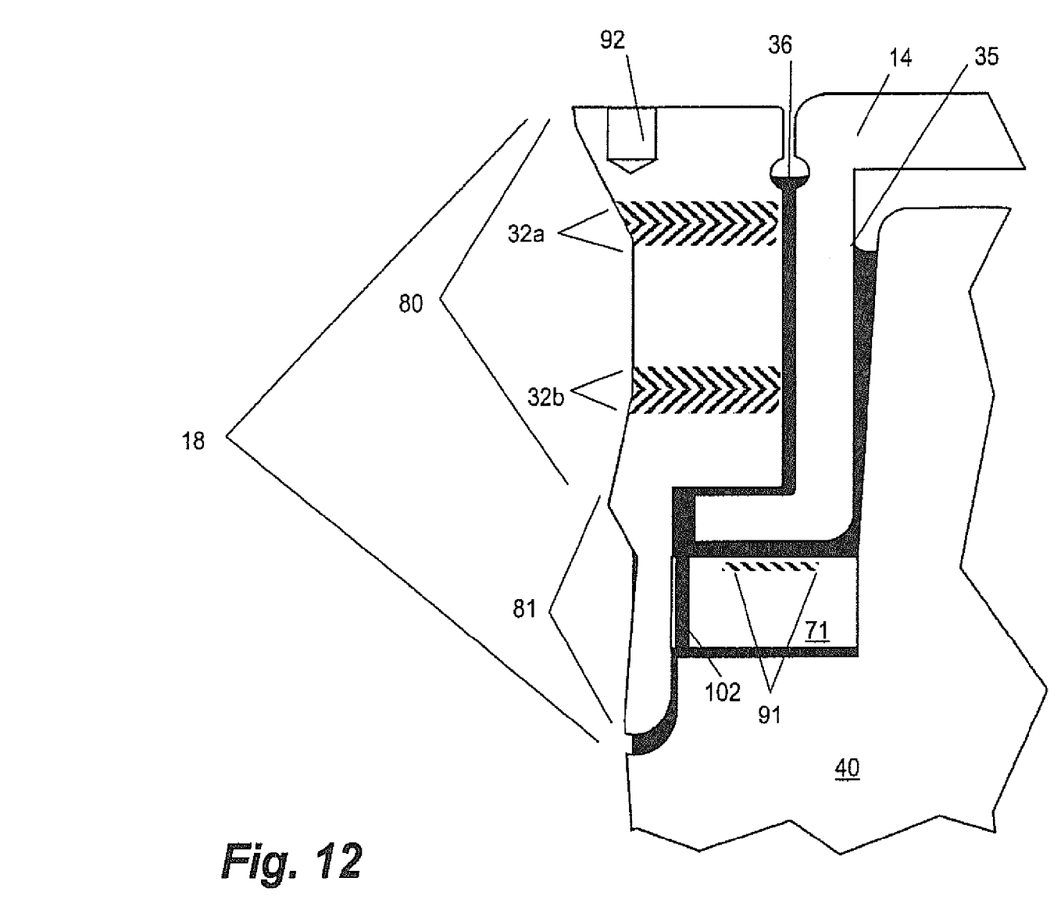
FIG. 12 illustrates a detail of the embodiment of FIG. 11.

FIG. 9 illustrates an exploded perspective view of the spindle, hub, and thrust washer assembly 93 and base with integrated cup 40, prior to assembly. FIG. 10 illustrates the embodiment shown in FIG. 9 in cross-section. FIG. 11 illustrates the embodiment of FIG. 9 after assembly, and FIG. 12 shows a detail of FIG. 11. Thrust washer 71 has a surface adjacent to hub 14 that is patterned to serve as a thrust bearing. Thrust washer 71 also has lubricant recirculation channel 102 adjacent to spindle 18, as shown. Although only one recirculation channel is shown, other embodiments may have more than one recirculation channel. Other embodiments may have thrust washers with recirculation channels more distal to the axis of spindle 18.

Referring again to FIG. 10, the integrated cup of base 40 can be at least partially filled with lubricant fluid prior to assembly with spindle, hub, and thrust washer assembly 93.

Although the present invention has been described in connection with some embodiments, it is not intended to be limited to the specific form set forth herein. For example, although embodiments for disc drive memory systems have been described, other embodiments could apply to motor assemblies for CD drives, DVD drives, or other applications. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order.

The figures provided are merely representational and may not be drawn to scale. Certain proportions thereof may be exaggerated, while others may be minimized. The figures are intended to illustrate various implementations of the invention that can be understood and appropriately carried out by those of ordinary skill in the art.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A motor assembly comprising:
   a spindle including at least one journal bearing pattern formed on a circumferential surface thereof and including a coupling structure depending from an end region;
   a base having a generally cup shaped structure formed therein, the generally cup shaped structure including an open first end portion, a second end portion, and an inner surface that tapers outwardly from at least about the second end portion to at least about the first end portion;
   a thrust washer having a fluid dynamic bearing pattern formed on a surface thereof, and defining a hole configured to couple with the coupling structure of the spindle, and having an outer circumferential region configured to fit within the generally cup shaped structure;
   a hub including a recessed region configured to fit rotatably between the spindle, the thrust washer, and the cup shaped structure, having an outer circumferential surface opposing at least a portion of the tapering inner surface of the cup shaped structure, and defining an opening through which the coupling structure of the spindle is fixedly secured to the hole of the thrust washer, and including a surface adjacent to the fluid dynamic bearing pattern formed on the surface of the thrust washer; and
   a stator coupled to the base.

2. The motor assembly of claim 1, wherein the coupling structure of the spindle couples to the hole of the thrust washer by press fit.

3. The motor assembly of claim 2, wherein the hub material comprises aluminum.

4. The motor assembly of claim 1, wherein the thrust washer couples to the generally cup shaped structure by press fit.

5. The motor assembly of claim 1,
wherein an outer circumferential surface of the spindle and an inner surface of the recessed region of the hub are contoured to form a capillary seal.

6. The motor assembly of claim 1,
wherein an outer circumferential surface of the recessed region of the hub and an inner surface of the generally cup shaped structure are contoured to form a capillary seal.

7. The motor assembly of claim 1, wherein the open first end portion of the generally cup shaped structure further comprises a surface that is configured to form a labyrinth seal with an adjacent surface of the hub.

8. The motor assembly of claim 1, wherein the hub further comprises a fluid recirculation channel.

9. The motor assembly of claim 1, wherein the spindle is configured to accept a bolt or a screw for the attachment of a motor assembly cover.

10. The motor assembly of claim 1, further comprising a disc including magnetic storage media mounted to rotate with the hub.

11. The motor assembly of claim 1, wherein the spindle material comprises one of steel and aluminum.

12. The motor assembly of claim 1, wherein the base material comprises one of steel, aluminum, and bronze.

13. The motor assembly of claim 1, wherein the thrust washer further comprises a fluid recirculation channel.

14. A motor assembly comprising:
a spindle including a first end region, a second end region, and at least one journal bearing pattern formed on a circumferential surface thereof and including a coupling structure depending from the second end region;
a base having a generally cup shaped structure formed therein, the generally cup shaped structure including an open first end portion, a second end portion, and an inner surface that tapers outwardly from at least about the second end portion to at least about the first end portion;
a thrust washer having first and second surfaces, and having a fluid dynamic bearing pattern formed on the first surface thereof, and defining a central hole configured to couple with the coupling structure of the spindle, and having an outer circumferential region configured to fit within the generally cup shaped structure;
a hub including a recessed region configured to fit rotatably between the spindle, the thrust washer, and the cup shaped structure, having an outer circumferential surface opposing at least a portion of the tapering inner surface of the cup shaped structure, and defining a central opening through which the coupling structure of the spindle is fixedly secured to the central hole of the thrust washer, and including a surface adjacent to the fluid dynamic bearing pattern formed on the first surface of the thrust washer;
a plurality of magnets disposed on an inside rim of the hub; and
a stator coupled to the base.

15. The motor assembly of claim 14, wherein an outer circumferential surface of the spindle and an inner surface of the recessed region of the hub are contoured to form a capillary seal.

16. The motor assembly of claim 14, wherein an outer circumferential surface of the recessed region of the hub and an inner surface of the generally cup shaped structure are contoured to form a capillary seal.

17. The motor assembly of claim 14, wherein the open first end portion of the generally cup shaped structure further comprises a lip, and a surface of the lip is configured to form a labyrinth seal with an adjacent surface of the hub.

18. The motor assembly of claim 14, wherein the thrust washer further comprises a fluid recirculation channel adjacent to the coupling structure of the spindle.

19. The motor assembly of claim 18, wherein the hub further comprises a fluid recirculation channel.

20. The motor assembly of claim 19, further comprising a disc including magnetic storage media mounted to rotate with the hub.

* * * * *